United States Patent [19]
Nakamura

[11] Patent Number: 5,858,202
[45] Date of Patent: Jan. 12, 1999

[54] METHOD FOR PRODUCING ELECTROLYTIC WATER AND APPARATUS FOR PRODUCING THE SAME

[75] Inventor: Tadamasa Nakamura, Tokyo, Japan

[73] Assignee: Zenkoku-Mokko-Kikai-Kan, Inc., Japan

[21] Appl. No.: 788,196

[22] Filed: Jan. 24, 1997

[30] Foreign Application Priority Data

Jan. 30, 1996 [JP] Japan .................................... 8-014534

[51] Int. Cl.$^6$ ................................................ C02F 1/461
[52] U.S. Cl. .......................... 205/746; 204/257; 204/275
[58] Field of Search .................................. 205/746, 770; 204/257, 275

[56] References Cited

U.S. PATENT DOCUMENTS

| | | | |
|---|---|---|---|
| 4,810,344 | 3/1989 | Okazaki | 204/228 |
| 5,316,646 | 5/1994 | Arai | 204/229 |

Primary Examiner—Arun S. Phasge
Attorney, Agent, or Firm—Lorusso & Loud

[57] ABSTRACT

The invention provides a method and apparatus for producing an electrolytic water whereby one electrolytic water used in compliance with its intended use is transformed into a water more effectively used and the by-product electrolytic water, previously disposed as virtually useless, is transformed into a water which can be effectively used by use of at least two electrolyzer in series. At least one of an outlet for a primary anodic electrolytic water in a primary electrolyzer and an outlet for a primary cathodic electrolytic water in a primary electrolyzer is connected to an inlet of a secondary electrolyzer through a first switching valve and a second switching valve. The anodic electrolytic water only, the primary cathodic electrolytic water only, or mixture of the primary anodic and primary cathodic electrolytic water is fed to the secondary electrolyzer to be electrolyzed again. A chlorine remover is provided within the secondary inlet for connecting the primary electrolyzer with the secondary electrolyzer and it removes chlorine from a primary electrolytic water, and afterward, the filtered water is electrolyzed again in the secondary electrolyzer. Tertiary electrolysis of the secondary anodic electrolytic water, produced by electrolysis of the primary anodic electrolytic water, will produce a tertiary anodic electrolytic water that exhibits a remarkably high bactericidal effect.

9 Claims, 1 Drawing Sheet

METHOD FOR PRODUCING ELECTROLYTIC WATER AND APPARATUS FOR PRODUCING THE SAME

BACKGROUND OF THE INVENTION

1. Field of the Invention

The present invention relates to a method for producing an electrolytic water whereby the effectiveness of one conventional type of electrolytic water is enhanced and the other type of electrolytic water, conventionally disposed of as virtually useless, is transformed into an electrolytic water which can be effectively used, and to an apparatus for producing the same.

2. Description of the Related Art

An electrolytic water producer has been known which produces an electrolytic acid water and electrolytic alkaline water by electrolyzing water. The main components of the electrolytic water producer are an electrolyzer and a power supply. The inside of the electrolyzer is divided into two areas by a separating membrane, in one area of which a positive electrode is disposed, and in the other area of which a negative electrode is disposed. Applying a current across both of the electrodes in the electrolyzer filled with water produces the electrolytic acid water in the area where the positive electrode is disposed and the electrolytic alkaline water in the area where the negative electrode is disposed.

The electrolytic alkaline water is recognized to be effective for depressing an abnormal intestinal fermentation and is used for a drinking water. The electrolytic acid water is acknowledged to be effective in bactericidal and astringent actions, and is used for cleaning and medical treatment. Thus, each type of electrolytic water has widely been used for enhancing health.

In evaluation of the electrolytic water, the pH value representing hydrogen ion concentration and the residual chlorine concentration have been conventionally used. However, as use of electrolytic water producers has become widespread, even without any significant differences in the pH value or in the residual chlorine concentration of the electrolytic water, differences in electrolytic water effectiveness are noted as dependent on apparatus and region of use.

In the electrolytic alkaline water, when the oxidation reduction potential and dissolved oxygen concentration are low, the water usually displays a high effectiveness for improving health; whereas when the oxidation reduction potential and dissolved oxygen concentration are comparably high, the water shows a low effectiveness for improving health in most cases. A low oxidation reduction potential was considered −50–250 mv, a low dissolved oxygen concentration was considered 4.8–6.8 mg/l, a high oxidation reduction potential was considered +100–+250 mv and a high dissolved oxygen concentration was considered 7–8.2 mg/l.

Accordingly, using an identical service water as the raw water, selecting a model A to produce an electrolytic water with a low oxidation reduction potential and a given pH value, and a model B to produce an electrolytic water with a comparably higher oxidation reduction potential and an identical pH value, a comparison test using rats was made simultaneously with the service water, the electrolytic water produced by the model A, and the electrolytic water produced by the model B by a single testing organization. The test results showed an influence on the gastric mucosal damage, i.e. that the area of erosion on a gastric mucosa tends to become smaller in the following order: electrolytic water produced by the model A, electrolytic water produced by the model B, and service water. A survival test using cancer transplanted immunodeffficient mice was made by another testing organization in a similar manner, and the test confirmed a similar tendency in the survival rate.

The oxidation reduction potential and dissolved oxygen concentration of the waters used in these tests were on average: +230 mv, 8.2 mg/l for the service water; −150 mv, 6.2 mg/l for the electrolytic alkaline water produced by the model A; and +75 mv, 7.6 mg/l for the electrolytic alkaline water produced by the model B.

Another test on the survival rate using critical immunodeffficient mice made by another organization employed: the service water with a pH of 7.6, an oxidation reduction potential of +520 mv, and a dissolved oxygen concentration of 78 mg/l; a first electrolytic alkaline water C (hereinafter "water C") with a pH of 10.4, an oxidation reduction potential of −485 mv, and a dissolved oxygen concentration of 5.8 mg/l; and a second electrolytic alkaline water D (hereinafter "water D") with a pH of 8.9, an oxidation reduction potential of −309 mv, and a dissolved oxygen concentration of 7.22 mg/l. The test results reported for the survival rate with the service water group, water C group, and water D group were 20.9%, 56.0%, 44.0%, respectively.

According to the aforementioned test results, in the electrolytic alkaline water, as the oxidation reduction potential and dissolved oxygen concentration become lower, the effectiveness becomes higher, indicating need for an apparatus which produces an electrolytic alkaline water with a low oxidation reduction potential and dissolved oxygen concentration, without being subject to influence by the state of the raw water.

The electrolytic acid water, produced as a waste water in producing the electrolytic alkaline water for drinking, is considered to have an astringent action and a bactericidal action. However, its effectiveness is not so apparent as to be really recognized in most cases, and most of such acidic waters are disposed as waste.

When the pH decreases to about 4, the oxidation reduction potential becomes more than +800 mv, and the dissolved oxygen concentration becomes more than 10 mg/l, the electrolytic acid water clearly displays the astringent action when applied to the skin and makes the skin smooth after the water dries. The electrolytic acid water gives the smooth feeling to the skin stronger and longer, as the pH value becomes lower, the oxidation reduction potential becomes higher, and the dissolved oxygen concentration becomes higher. The bacteriostatic effect also has a similar tendency. For example, if the pH value is less than 3.5, the oxidation reduction potential is more than +900 mv, and the dissolved oxygen concentration is more than 12 mg/l, the electrolytic acid water will exhibit such a strong bactericidal activity as to kill most bacteria in a short time even with a dissolved chlorine concentration of about 2 ppm, indicating possible utility as an effective antibacterial agent that does not damage the skin or mocosa.

However, the conventional apparatus can not stably produce an effective acid electrolytic water, because the water quality of the raw water, e.g. service water, changes significantly with the seasons, with temperature, and with time. Furthermore, the conventional apparatus required such maintenance control that an electrolyte solution of a specific concentration always has to be kept so as not to be out of stock.

The raw water fed to the electrolytic water producer sometimes contains free chlorine as hypochlorite, iron rust, and turbidity. In such a case, it is a common practice to pass the raw water through a chlorine remover having a filter for rejecting chlorine of an activated carbon alone or a combination of an activated carbon, hollow fiber membranes and calcium sulfites, and afterward to feed the raw water into the electrolytic water producer. Furthermore, where the major objective is producing an electrolytic water with bactericidal activity, it is also a common practice to add chlorides such as a sodium chloride and/or potassium chloride to the raw water as electrolytes.

There are various types of such apparatus: one type employing a constant current power supply as the power supply to the electrodes in order to stabilize electrolysis; apparatus capable of switching the ranges of a current from a constant current power supply; and apparatus with a pH controller that measures the electric conductivity of an electrolytic water and feeds back the measured result to the electrolyzing power supply.

In the case of the apparatus capable of producing the electrolytic alkaline water for drinking such that the pH value does not exceed 11, the oxidation reduction potential will vary in the range from +150 mv to −250 mv and will be unstable, depending on the potential of the raw water, the gas dissolved in the raw water, the electrolytes contained in the raw water, and the quantity of water treated.

In case of the apparatus provided with the pH controller, it is possible to produce an electrolytic water with a comparably stable pH value; however, the oxidation reduction potential changes significantly, depending on differences in the raw water as in the previous case.

When chlorides are added as electrolytes, it is possible to produce an electrolytic acid water with a low pH value and a high oxidation reduction potential; however, this technique is prone to a high free dissolved chlorine concentration of more than 50–150 ppm and it has proven very difficult to reliably suppress the flee dissolved chlorine concentration to less than a specific limit.

On the other hand, the electrolytic acid water containing free chlorine has a bactericidal effect. For instance, in the treatment of atopic dermatitis with a serious secondary infection, a high chlorine concentration displays a significant effect of skin disinfection. The free dissolved chlorine concentration contained in an electrolytic acid water does not damage a healthy skin up to about 50 ppm; however, if the electrolytic acid water is repeatedly applied several times a day to a skin that is chapped or inflamed or anaphylactic, the electrolytic acid water with a chlorine concentration of more than 25 ppm reportedly causes a slight damage such as eruption owing to irritation. Therefore, the chlorine concentration should be controlled to less than 20 ppm for safety, except for use under supervision of a doctor.

Furthermore, electrolytic alkaline water coproduced with electrolytic acid water having a strong bactericidal effect will sometimes have a high pH value exceeding pH 11 and a low oxidation reduction potential of less than −800 mv. Such an electrolytic alkaline water is rich in metal ions such as sodium and potassium ions derived from electrolytes, and drinking such an electrolytic alkaline water is a danger to one's physical condition and it is very bad tasting. Accordingly, such alkaline water has been disposed as waste, although it can be used for cleaning utensils and the like.

Generally, the quantity of added electrolytes is in the range of 500±200 mg/l as sodium chloride. In the case of chlorine ions as electrolytes contained in the service water as a raw water, the maximum level of chlorine ion content consistent with water quality standards is 200 mg/l (329 mg/l as NaCl). Accordingly, in the electrolyte addition type apparatus also, the quality of the raw water specially significantly influences the oxidation reduction potential and free dissolved chlorine concentration of the electrolytic water thereby produced.

In the conventional apparatus, the electrolysis is conducted in one electrolyzer; and for a raw water of constant quality, the quantity of water to be treated and the amount of current to be applied will determine a quantitative combination of a pH value, oxidation reduction potential, dissolved oxygen concentration, free dissolved chlorine concentration, electric conductivity, and the like. Consequently, it was difficult to simultaneously produce an electrolytic water with a different quantitative combination of these and also difficult to produce an electrolytic alkaline water suitable for drinking and an electrolytic acid water with a bactericidal and bacteriostatic effect.

Furthermore, the conventional apparatus is designed without paying attention to the function of dissolved oxygen and, in fact, the dissolved oxygen concentration of the electrolytic water is completely disregarded.

SUMMARY OF THE INVENTION

The present invention has been made in view of the foregoing problems, and an object of the present invention is to provide a method for producing an acidic or alkaline type electrolytic water which can be more effectively used by repeating electrolysis more than two times and the other type electrolytic water, conventionally disposed as virtually useless, as an electrolytic water which can also be effectively used, and to provide an apparatus for producing the same.

Another object of the invention is to provide an apparatus in which any one of an anodic electrolytic water or cathodic electrolytic water obtained by primary electrolysis or a mixed water of these can be selected and fed into a secondary electrolyzer so as to be secondarily electrolyzed.

Another object of the invention is to provide a method for producing an electrolytic water with a remarkably high bactericidal effect.

In order to accomplish the aforementioned objects, in a method for producing an electrolytic water, according to one aspect of the present invention, a water is electrolyzed into an anodic electrolytic water and a cathodic electrolytic water in a primary electrolyzer having an area provided with an anode and an area provided with a cathode divided by a separating membrane, and a water produced in the primary electrolyzer is secondarily electrolyzed in a secondary electrolyzer.

Furthermore, according to another aspect of the present invention, an apparatus is provided for producing an electrolytic water, which apparatus includes a primary electrolyzer provided with an anode and a cathode and a separating membrane for dividing the primary electrolyzer into an area containing the anode and an area containing the cathode, a secondary electrolyzer provided with an anode and a cathode and a separating membrane for dividing the secondary electrolyzer into an area containing the anode and an area containing the cathode. An outlet for primary anodic electrolytic water connects the area containing the anode of the primary electrolyzer to a first switching valve, an outlet for a primary cathodic electrolytic water connects to the area containing the cathode of the primary electrolyzer to a second switching valve and a combined water passage connects the first switching valve with the second switching valve. A secondary inlet connects the combined water passage at one end with the secondary electrolyzer at its other end. Further, an outlet for a secondary anodic electrolytic water is connected to the area containing the anode in the secondary electrolyzer, and an outlet for a secondary cathodic electrolytic water is connected to the area containing the cathode in the secondary electrolyzer.

According to another aspect of the invention, in the method for producing an electrolytic water, a primary anodic electrolytic water is secondarily electrolyzed to produce a secondary anodic electrolytic water, and the secondary anodic electrolytic water is electrolyzed to produce a tertiary anodic electrolytic water.

BRIEF DESCRIPTION OF THE DRAWING

Preferred embodiments of the present invention will hereinafter be described with reference to the accompanying drawing.

Figure 1:
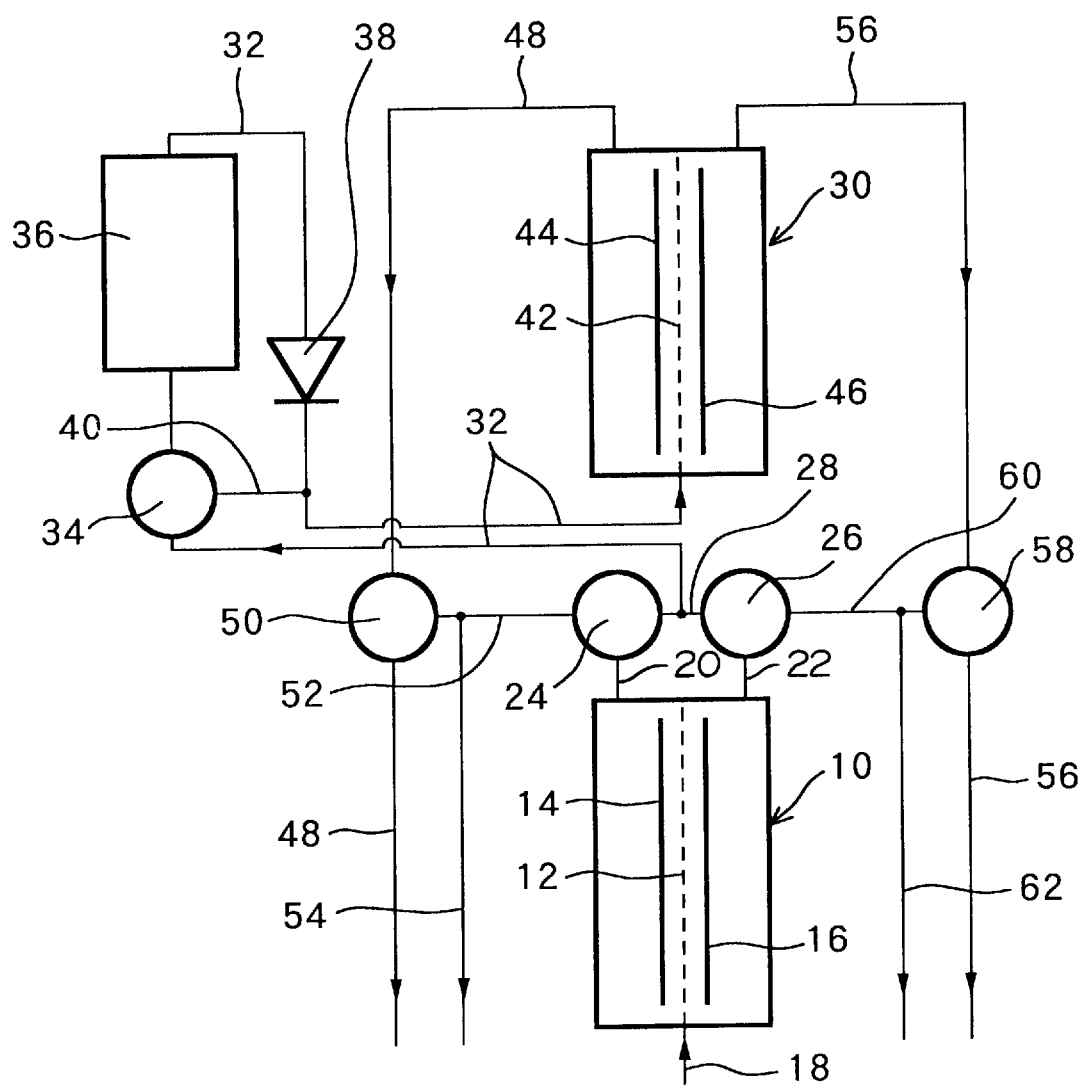
FIG. 1 illustrates an apparatus used for producing an electrolytic water according to the present invention.

The interior of a primary electrolyzer 10 is divided into two areas by a separating membrane 12, in one area of which an positive electrode is provided, and in the other area of which a negative electrode is provided. The primary electrolyzer 10 is provided with a primary inlet 18 for receiving a raw water, an outlet 20 for a primary anodic electrolytic water communicating with the area containing the positive electrode 14, and an outlet 22 for a primary cathodic electrolytic water communicating with the area containing the negative electrode 16.

In the primary electrolyzer 10, the anodic electrolytic water produced at the positive electrode 14 is removed through outlet 20 as the primary anodic electrolytic water, i.e., the acid water, and the cathodic electrolytic water produced at the negative electrode 16 is removed through outlet 22 as the primary cathodic electrolytic water, i.e., the alkaline water.

The outlet passage 20 for the primary anodic electrolytic water is connected to a first switching valve 24, the outlet 22 for the primary cathodic electrolytic water is connected to a second switching valve 26, and a combined outlet 28 connects the first switching valve 24 with the second switching valve 26.

In addition to the primary electrolyzer 10, a secondary electrolyzer 30 is provided, and a secondary inlet passage 32 connects the secondary electrolyzer 30 to the mid-point of the combined outlet 28. That is, an electrolytic water produced in the primary electrolyzer 10 is fed into the secondary electrolyzer 30 through the secondary inlet passage 32. Mid-way of the secondary inlet 32, a third switching valve 34, chlorine remover 36, and a check-valve 38 are provided in sequence toward the secondary electrolyzer 30. The chlorine remover 36 has a filter for removing chlorine using activated carbon or the like. A bypass passage 40 connects the third switching valve 34 with the secondary incoming passage 32 between the check-valve 38 and the secondary electrolyzer 30.

The secondary electrolyzer 30 has the same construction as the primary electrolyzer 10. The interior of the secondary electrolyzer 30 is divided into two areas by a separating membrane 42, in one of which areas an anode 44 is provided, and in the other area a cathode 46 is provided. A secondary anodic electrolytic water outlet 48 is connected to the area where the anode 44 of the secondary electrolyzer 30 is disposed, and the anodic electrolytic water electrolyzed in the secondary electrolyzer 30 is removed through the secondary anodic electrolytic water outlet 48. A fourth switching valve 50 is provided in the secondary anodic electrolytic water outlet 48, and an anodic electrolytic water communicating passage 52 connects the fourth switching valve 50 with the first switching valve 24. An anodic electrolytic water inlet 54 is connected to the anodic electrolytic water communicating passage 52.

A secondary cathodic electrolytic water outlet 56 is connected to the area where the negative electrode 46 of the secondary electrolyzer 30 is disposed, and the cathodic electrolytic water electrolyzed in the secondary electrolyzer 30 is taken out through the secondary cathodic electrolytic water passage 56. A fifth switching valve 58 is provided on the secondary cathodic electrolytic water outlet 56, and a cathodic electrolytic water communicating passage 60 connects the fifth switching valve 58 with the second switching valve 26. A primary cathodic electrolytic water outlet 62 is connected to the cathodic electrolytic water communicating passage 60.

An electronic controller (not illustrated) controls the power supply and voltage regulation for the primary electrolyzer and the secondary electrolyzer 30 and the switching operations of the switching valves 24, 26, 34, 50, and 58.

The operation of the apparatus will now be described, first, for the case wherein only the anodic electrolytic water produced in the primary electrolyzer 10 is electrolyzed in the secondary electrolyzer 30. The first switching valve 24 is positioned to connect the outlet 20 for the primary anodic electrolytic water to the combined outlet 28, so that the anodic electrolytic water produced in the primary electrolyzer 10 is fed into the secondary electrolyzer 30 through the combined outlet 28 and the secondary inlet 32. The third switching valve 34 provided in the secondary inlet 32 is switched so as to connect the combined outlet passage 28 to the bypass 40. That is, the anodic electrolytic water, produced in the primary electrolyzer 10, does not pass through the chlorine remover 36.

The second switching valve 26 is switched to connect the outlet 22 for the primary cathodic electrolytic water to the cathodic electrolytic water communicating passage 60 only, so that the cathodic electrolytic water produced in the primary electrolyzer 10 can be routed through the cathodic electrolytic water communicating passage 60 and through the primary cathodic electrolytic water outlet 62. The fourth switching valve 50 is switched so as to communicate the secondary electrolyzer 30 with the atmospheric side of the secondary anodic electrolytic water outlet 48. The fifth switching valve 58 is switched so as to communicate the secondary electrolyzer 30 with the atmospheric side of the secondary cathodic electrolytic water outlet 56.

The cathodic electrolytic water removed through the primary cathodic electrolytic water outlet 62 is an electrolytic alkaline water, and this cathodic electrolytic water is used in the conventional manner. However, the anodic electrolytic water that is conventionally disposed of as waste is electrolyzed again in the secondary electrolyzer 30.

The foregoing also applies to a case wherein the anodic electrolytic water is produced as the major product and is electrolyzed in the secondary electrolyzer 30. In this case, although the cathodic electrolytic water by-product is conventionally disposed of as waste, it too may be electrolyzed in another secondary electrolyzer (not illustrated).

When a water is electrolyzed in the primary electrolyzer 10 and the secondary electrolyzer 30 with the switching valves 24, 26, 34, 50, and 58 switched as mentioned above, the anodic electrolytic water produced in the primary electrolyzer 10 is introduced into the secondary electrolyzer 30 from the first switching valve 24 through the secondary inlet 32 to be electrolyzed in the secondary electrolyzer 30. The secondary anodic electrolytic water electrolyzed in the anode compartment of the secondary electrolyzer 30 is removed through the secondary anodic electrolytic water outlet 48 and through the fourth switching valve 50. On the other hand, the cathodic electrolytic water produced in the cathode compartment of the secondary electrolyzer 30, by electrolysis of the anodic electrolytic water from the primary electrolyzer 10, is removed through the secondary cathodic electrolytic water outlet 56 and through the fifth switching valve 58.

Furthermore, the fourth switching valve 50 may be switched to connect the secondary anodic electrolytic water outlet 48, leading from the secondary electrolyzer 30, to the anodic electrolytic water communicating passage 52, 50 that the first switching valve 24 can be connected not only to the combined outlet 28 but also to the anodic electrolytic water communicating passage 52. In this case, the anodic electrolytic water produced in the primary electrolyzer 10 and the anodic electrolytic water produced in the secondary electrolyzer 30 are mixed, and the mixed anodic electrolytic water is removed through the primary anodic electrolytic water outlet 54.

Next, the operation of the apparatus will be described for the case where only the cathodic electrolytic water produced in the primary electrolyzer 10 is electrolyzed in the secondary electrolyzer 30. The second switching valve 26 is switched to connect the outgoing passage 22 for the primary cathodic electrolytic water to the combined outlet 28, so that the cathodic electrolytic water produced in the primary electrolyzer 10 can be introduced into the secondary electrolyzer 30 from the combined outlet passage 28 through the secondary inlet 32. The third switching valve 34 provided in the secondary inlet 32 is switched so as to connect the combined outlet 28 to the bypass 40. That is, the cathodic electrolytic water produced in the primary electrolyzer 10 is routed so as not to pass through the chlorine remover 36.

The first switching valve 24 is switched to connect the outlet 20 for the primary anodic electrolytic water to the anodic electrolytic water communicating passage 52 only, so that the anodic electrolytic water produced in the primary electrolyzer 10 can be removed through the anodic electrolytic water communicating passage 52 and through the primary anodic electrolytic water outlet 54. The fifth switching valve 58 is switched so as to communicate the secondary electrolyzer 30 with the atmospheric side of the secondary cathodic electrolytic water outlet 56. The fourth switching valve 50 is switched so as to communicate the secondary electrolyzer 30 with the atmospheric side of the secondary anodic electrolytic water outlet 48.

The anodic electrolytic water removed through the primary anodic electrolytic water passage 54 is an electrolytic acid water, and this anodic electrolytic water is put to conventional uses. However, the cathodic electrolytic water that has conventionally been disposed of as waste is electrolyzed again in the secondary electrolyzer 30.

When cathodic electrolytic water which is produced as the major product is again electrolyzed in the secondary electrolyzer 30, although the anodic electrolytic water taken would conventionally be disposed as waste, it may be electrolyzed in another secondary electrolyzer (not illustrated).

When a water is electrolyzed in the primary electrolyzer 10 and the secondary electrolyzer 30 with the switching valves 24, 26, 34, 50, and 58 positioned as mentioned above, the cathodic electrolytic water produced in the primary electrolyzer 10 is introduced into the secondary electrolyzer 30 from the second switching valve 26 through the secondary inlet 32 to be electrolyzed in the secondary electrolyzer 30. The secondary cathodic electrolytic water produced in the cathode area of the secondary electrolyzer 30 is removed through the secondary cathodic electrolytic water outlet 56 via the fifth switching valve 58. On the other hand, the water produced in the anode area of the secondary electrolyzer 30 from the cathodic electrolytic water produced in the primary electrolyzer 10 is removed through the secondary anodic electrolytic water outlet 48 via the fourth switching valve 50.

The fifth switching valve 58 may be switched to connect the secondary cathodic electrolytic water outlet 56 on the side of the secondary electrolyzer 30 to the cathodic electrolytic water communicating passage 60, 50 that the second switching valve 26 can be connected not only to the combined outlet 28 but also to the cathodic electrolytic water communicating passage 60. In this arrangement, the cathodic electrolytic water produced in the primary electrolyzer 10 and the cathodic electrolytic water electrolyzed in the secondary electrolyzer 30 are mixed, and the mixed cathodic electrolytic water is removed through the primary cathodic electrolytic water outlet 62.

In another embodiment, a mixture of the anodic electrolytic water and the cathodic electrolytic water produce d in the primary electrolyzer 10 is electrolyzed in the secondary electrolyzer 30. In this case, the first switching valve 24 is switched to connect the outlet 20 for the primary anodic electrolytic water to the combined outlet 28, and the second switching valve 26 is switched to connect the outlet 22 for the primary cathodic electrolytic water to the combined outlet 28. Thus, the anodic electrolytic water and the cathodic electrolytic water produced in the primary electrolyzer 10 are mixed in the combined outlet 28, and this water mixture is routed to the secondary electrolyzer 30 through the secondary inlet passage 32. The third switching valve 34 provided in the secondary inlet 32 is switched so as to communicate the combined outlet 28 with the bypass 40. That is, the cathodic electrolytic water produced in the primary electrolyzer 10 is routed so as not to pass through the chlorine remover 36.

The fourth switching valve 50 is switched to bring the secondary electrolyzer 30 into communication with the atmospheric side of the secondary anodic electrolytic water outlet 48. The fifth switching valve 58 is switched so as to bring the secondary electrolyzer 30 into communication with the atmospheric side of the secondary cathodic electrolytic water outlet 56.

Water is electrolyzed in the primary electrolyzer 10 and in the secondary electrolyzer 30 with the switching valves 24, 26, 34, 50, and 58 positioned as mentioned above. As the result, the anodic electrolytic water and the cathodic electrolytic water electrolyzed in the primary electrolyzer 10 are mixed and introduced into the secondary electrolyzer 30 through the third switching valve 34 and the secondary inlet 32 to be electrolyzed in the secondary electrolyzer 30. The anodic electrolytic water produced in the anode area of the secondary electrolyzer 30 is removed via the secondary anodic electrolytic water outlet 48 via the fourth switching valve 50. The cathodic electrolytic water produced in the cathode area of the secondary electrolyzer 30 is removed through the secondary cathodic electrolytic water outlet 56 via the fifth switching valve 58.

The fourth switching valve 50 may be switched to connect the secondary anodic electrolytic water passage 48 to the anodic electrolytic water communicating passage 52, so that the first switching valve 24 can be connected not only to the combined outlet 28 but also to the anodic electrolytic water communicating passage 52. Moreover, the fifth switching valve 58 may be switched to connect the secondary cathodic electrolytic water outlet 56 to the cathodic electrolytic water communicating passage 60, so that the second switching valve 26 can be connected not only to the combined outlet 28 but also to the cathodic electrolytic water communicating passage 60.

Experiment #1

In experiment 1 a service water is electrolyzed in the primary electrolyzer 10 and the primary electrolytic water is secondarily electrolyzed in the secondary electrolyzer 30.

The service water used in this experiment showed pH 7.6, electric conductivity 160 $\mu$S/cm, dissolved oxygen concentration 8.5 mg/l, oxidation reduction potential 584 mv, and free dissolved chlorine concentration 0.6 mg/l. The primary electrolyzer 10 was operated with a water temperature of 21.6° C., water flow rate of 1.41 1/mm, and electrolyzing voltage at 18 V. As the result, a primary anodic electrolytic water was produced which showed a pH of 4.5, an electric conductivity of 189 $\mu$S/cm, a dissolved oxygen concentration of 10.5 mg/l, an oxidation reduction potential of 780 mv, a free dissolved chlorine concentration of 1.3 mg/l, and a primary cathodic electrolytic water was produced which showed a pH of 9.6, an electric conductivity of 210 $\mu$S/cm, a dissolved oxygen concentration of 6.8 mg/l, an oxidation reduction potential of −153 mv, and a free dissolved chlorine concentration of 0.2 mg/l.

Only the primary anodic electrolytic water produced in the primary electrolyzer 10 was secondarily electrolyzed in the secondary electrolyzer 30, and a secondary anodic electrolytic water was produced which showed a pH of 3.2, an electric conductivity of 381 $\mu$S/cm, a dissolved oxygen concentration of 14.1 mg/l, an oxidation reduction potential of 930 mv, a free dissolved chlorine concentration of 2 mg/l, and a secondary cathodic electrolytic water was produced which showed a pH of 6.7, an electric conductivity of 141 $\mu$S/cm, a dissolved oxygen concentration of 8.2 mg/l, an oxidation reduction potential of 2 mv, and a free dissolved chlorine concentration of 0.5 mg/l.

In the secondary anodic electrolytic water produced by electrolyzing the primary anodic electrolytic water again in the secondary electrolyzer 30, the dissolved oxygen concentration increased from 10.5 mg/l to 14.1 mg/l, the oxidation reduction potential changed from 780 mv to 930 mv, and the free dissolved chlorine concentration changed from 1.3 mg/l to 2 mg/l. That is, the secondary anodic electrolytic water showed a higher dissolved oxygen concentration, oxidation reduction potential, and free dissolved chlorine concentration than the primary anodic electrolytic water. Therefore, the secondary anodic electrolytic water can be used for its astringent effect and curative effect in treatment of atopic dermatitis.

Further, the cathodic electrolytic water produced by secondarily electrolyzing the primary anodic electrolytic water showed a lower oxidation reduction potential and free dissolved chlorine concentration than the service water, indicating a suitability for drinking.

On the other hand, when only the primary cathodic electrolytic water produced in the primary electrolyzer 10 was secondarily electrolyzed in the secondary electrolyzer 30, the secondary anodic electrolytic water so produced showed a pH of 8.3, an electric conductivity of 158 $\mu$S/cm, a dissolved oxygen concentration of 9.8 mg/l, an oxidation reduction potential of 38 mv, and a free dissolved chlorine concentration of 0.9 mg/l. The secondary cathodic electrolytic water so produced showed a pH of 10.1, an electric conductivity of 312 $\mu$S/cm, a dissolved oxygen concentration of 4.8 mg/l, an oxidation reduction potential of −828 mv, and a free dissolved chlorine concentration of 0.1 mg/l.

Thus, in the secondary cathodic electrolytic water produced by electrolyzing the primary cathodic electrolytic water again in the secondary electrolyzer 30, the dissolved oxygen concentration decreased from 6.8 mg/l to 4.8 mg/l and the oxidation reduction potential decreased from −153 mv to −828 mv. Therefore, the secondary cathodic electrolytic water is preferable to the primary cathodic electrolytic water for drinking.

The anodic electrolytic water produced by secondarily electrolyzing the primary cathodic electrolytic water showed a pH value of 8.3, indicating a slight alkalinity. However, the free dissolved chlorine concentration was 0.9 mg/l (the average free dissolved chlorine concentration of the service water is 1.0 mg/1), indicating suitability for general use as service water.

When a mixture of the primary anodic electrolytic water and primary cathodic electrolytic water produced in the primary electrolyzer 10 was secondarily electrolyzed in the secondary electrolyzer 30, an anodic electrolytic water was produced which showed a pH of 3.84, an electric conductivity of 230 $\mu$S/cm, a dissolved oxygen concentration of 12.6 mg/l, an oxidation reduction potential of 900 mv, and a free dissolved chlorine concentration of 2 mg/l. A cathodic electrolytic water was produced which showed a pH of 10.6, an electric conductivity of 250 $\mu$S/cm, a dissolved oxygen concentration of 5.6 mg/l, an oxidation reduction potential of −460 mv, and a free dissolved chlorine concentration of 0.2 mg/l.

Thus, secondarily electrolyzing the mixture of the primary anodic electrolytic water and primary cathodic electrolytic water will raise the dissolved oxygen concentration of 10.5 mg/l and oxidation reduction potential of 780 mv of the primary anodic electrolytic water to higher levels, i.e. to a dissolved oxygen concentration of 12.6 mg/l and an oxidation reduction potential of 900 mv in the secondary anodic electrolytic water, thus improving the quality of water as compared to the primary electrolytic acid water. Furthermore, the secondary electrolysis lowers the dissolved oxygen concentration of 6.8 mg/l and oxidation reduction potential of −153 mv of the primary cathodic electrolytic water, i.e. to a dissolved oxygen concentration of 5.6 mg/l and an oxidation reduction potential of −460 mv in the secondary cathodic electrolytic water, thus improving the quality of the water as compared to the primary electrolytic alkaline water.

Experiment #2

In experiment 2 service water of the same quality as in experiment 1 was electrolyzed with the same water flow rate as in experiment 1 and with an electrolyzing voltage of 28 V. As a result, a primary anodic electrolytic water was produced which showed a pH of 3.52, an electric conductivity of 389 $\mu$S/cm, a dissolved oxygen concentration of 12.4 mg/l, an oxidation reduction potential of 820 mv, and a free dissolved chlorine concentration of 1.5 mg/l. Further, a primary cathodic electrolytic water was produced which showed a pH of 10.6, an electric conductivity of 313 $\mu$S/cm, a dissolved oxygen concentration of 6.8 mg/l, an oxidation reduction potential of −758 mv, and a free dissolved chlorine concentration of 0.3 mg/l.

Next, only the primary anodic electrolytic water produced in the primary electrolyzer 10 was secondarily electrolyzed in the secondary electrolyzer 30, and a secondary anodic electrolytic water was produced which showed a pH of 2.7, an electric conductivity of 940 μS/cm, a dissolved oxygen concentration of 22.5 mg/l, an oxidation reduction potential of 1030 mv, and a free dissolved chlorine concentration of 10 mg/l. This secondary anodic electrolytic water had a high free dissolved chlorine concentration as compared to the free dissolved chlorine concentration obtained in experiment 1 (2 mg/l), indicating a strong bactericidal activity.

In addition, a cathodic electrolytic water was produced which showed a pH of 9.4, an electric conductivity of 101 μS/cm, a dissolved oxygen concentration of 6.2 mg/l, an oxidation reduction potential of −825 mv, and a free dissolved chlorine concentration of 0.4 mg/l. Although this cathodic electrolytic water showed a slightly high free dissolved chlorine concentration, it is still within the standard and can be an ideal drinking water.

When only the primary cathodic electrolytic water produced in the primary electrolyzer 10 was secondarily electrolyzed in the secondary electrolyzer 30, an anodic electrolytic water was produced which showed a pH of 7.1, an electric conductivity of 72 μS/cm, a dissolved oxygen concentration of 21.9 mg/l, an oxidation reduction potential of 671 mv, and a free dissolved chlorine concentration of 8 mg/l. This anodic electrolytic water was neutral and very high in dissolved oxygen concentration (double that of a conventional oxygen saturated water), and can be used as a bacteriostatic agent.

The secondary cathodic electrolytic water thus produced showed a pH of 11.4, an electric conductivity of 521 μS/cm, a dissolved oxygen concentration of 4.2 mg/l, an oxidation reduction potential of −863 mv, and a free dissolved chlorine concentration of 0.01 mg/l. This secondary cathodic electrolytic water shows a high pH value. However, it contains a slight amount of metal ions (sodium ion, potassium ion, etc.) paired with the hydroxyl groups and, therefore, the cathodic electrolytic water is unstable in pH, easy to drink without a sense of rejection, and can be an anoxic water that does not cause a disorder due to strong alkalinity.

When the anodic electrolytic water and cathodic electrolytic water produced in the primary electrolyzer 10 were mixed, and the mixed water showed a pH of 10.62, an electric conductivity of 207 μS/cm, a dissolved oxygen concentration of 7.8 mg/l, an oxidation reduction potential of −97 mv, a free dissolved chlorine concentration 0.66 mg/l, which is a weak alkaline water with an oxidation reduction potential significantly lower than the raw water. This mixed water was secondary electrolyzed in the secondary electrolyzer 30, and an anodic electrolytic water was produced which showed a pH of 3.1, an electric conductivity of 402 μS/cm, a dissolved oxygen concentration of 26.7 mg/l, an oxidation reduction potential of 950 mv, and a free dissolved chlorine concentration of 7.5 mg/l. Thus, the dissolved oxygen concentration and oxidation reduction potential of the secondary anodic electrolytic water were higher than in the primary anodic electrolytic water, and thus the quality of the secondary anodic electrolytic water was higher than that of the primary electrolytic acid water.

The secondary cathodic electrolytic water produced from the mixed water showed a pH of 11.2, an electric conductivity of 353 μS/cm, a dissolved oxygen concentration of 5 mg/l, an oxidation reduction potential of −844 mv, and a free dissolved chlorine concentration of 0.5 mg/l. This secondary cathodic electrolytic water is effective for sterilization and oxidation and is an electrolytic alkaline water with a strong reduction power. Thus, the dissolved oxygen concentration and oxidation reduction potential of the secondary cathodic electrolytic water are lower than in the primary cathodic electrolytic water, and its quality is better than that of the primary electrolytic alkaline water.

In order to remove the dissolved chlorine from the electrolytic alkaline water, the water was passed through an activated carbon filter, and the result was that, although the pH value decreased 0.2 to 0.5, the electric conductivity and the dissolved oxygen concentration were almost unchanged, and the oxidation reduction potential increased by 50 to 100 mv, all of which values are within ranges effective for drinking.

Next, the method of removing chlorine contained in the water primarily electrolyzed, prior to secondary electrolysis, will be described. In FIG. 1, first, the third switching valve 34 provided in the secondary inlet 32 is switched so as to pass the water from the secondary inlet 32 in sequence through the chlorine remover 36 and the check-valve 38.

The electrolytic water produced in the primary electrolyzer 10 is passed through the chlorine remover 36 containing a chlorine removal filter of an activated carbon or the like. After the free dissolved chlorine is removed, the water is electrolyzed in the second electrolyzer 30. When the primary anodic electrolytic water was electrolyzed in the electrolyzer 30 and the secondary anodic electrolytic water so produced with chlorine filtering was compared to that produced without chlorine filtering, the pH value was seen to be higher by 0.3, the electric conductivity lower by about 200 μS/cm, the oxidation reduction potential lower by about 100 mv, and the dissolved oxygen concentration and free dissolved chlorine concentration did not change. And, in the cathode area, the pH value decreased by about 1, the electric conductivity increased by about 30 μS/cm, the oxidation reduction potential decreased by about 100 mv, and the free dissolved chlorine concentration decreased to 0.1.

When the secondary cathodic electrolytic water produced with chlorine filtering was compared with that produced without chlorine filtering, the pH value was seen to be lower by about 3 and the neutral water changed into a distinctively acidic water, the electric conductivity increased by about 10 μS/cm, the oxidation reduction potential increased by about 100 mv, and the dissolved oxygen concentration and the free dissolved chlorine concentration did not change. In the cathode area, the pH value did not change, the electric conductivity decreased by about 50 μS/cm, and the oxidation reduction potential and free dissolved chlorine concentration decreased to 0.1.

Consequently, secondarily electrolyzing the primary electrolytic water after filtering out the chlorine contained therein tends to increase the pH and to decrease the oxidation reduction potential in the secondary anodic electrolytic water; however, the value remains within a range showing the astringent effect, and the secondary cathodic electrolytic water shows a decrease in the dissolved chlorine so that it becomes an electrolytic alkaline water more suitable for drinking.

Thus, by chlorine filtering between the primary and secondary electrolysis, the free dissolved chlorine concentration in the secondary electrolytic water is decreased to less than 15 ppm.

Experiment #3

In the forgoing embodiment, secondary electrolysis was described; however, when a tertiary electrolysis or still higher-order electrolysis is performed, a higher-order electrolytic anodic water shows a higher dissolved oxygen concentration and oxidation reduction potential, and a higher-order cathodic electrolytic water shows a lower dissolved oxygen concentration and oxidation reduction potential.

In a third experiment tertiary electrolysis was performed, that is, the tertiary electrolysis was applied to the waters obtained through the secondary electrolysis. Among the tertiary electrolytic waters, the tertiary anodic electrolytic water produced by electrolyzing a secondary anodic electrolytic water, in turn produced by electrolyzing the primary anodic electrolytic water, was found to display a distinctive sterilization effect.

The experimental data for the service water (raw water), the primary anodic electrolytic water, the secondary anodic electrolytic water, and the tertiary anodic electrolytic water was as follows.

|  | pH | oxidation reduction potential | dissolved oxygen concentration | free dissolved chlorine concentration |
|---|---|---|---|---|
| service water | 7.19 | 574 | 9.6 | 0.6 |
| primary a.w. | 2.56 | 871 | 11.6 | 6 |
| secondary a.w. | 1.87 | 907 | 16.4 | 6 |
| tertiary a.w. | 1.45 | 1071 | 24.6 | 15 |

"a.w." is an abbreviation for anodic ectrolytic water.

From the results of this experiment, a big change is seen in the pH between the primary anodic electrolytic water and the secondary anodic electrolytic water, i.e. 2.56 versus 1.87, which is a big change, while the oxidation reduction potential and dissolved oxygen concentration changed only slightly, and the free dissolved chlorine concentration remained unchanged. In contrast, between the secondary and the tertiary anodic electrolytic water, the pH decreased to less than 1.5 (the acidity became very strong) and, furthermore, the oxidation reduction potential increased by about 160 mv, the dissolved oxygen concentration increased to about 1.5 times, and the free dissolved chlorine concentration increased 2.5 times.

Thus, when the secondary anodic electrolytic water is electrolyzed to produce the tertiary anodic electrolytic water, the pH, oxidation reduction potential, dissolved oxygen concentration, and free dissolved chlorine concentration are significantly changed to values exhibiting a bactericidal effect, and the tertiary anodic electrolytic water displays a very strong bactericidal activity that had not been obtained up to the present.

As described hereinabove, according to the present invention, an electrolytic water in compliance with its intended use can be transformed into an electrolytic water more effectively used by repeating electrolysis more than two times, and the electrolytic acid water for drinking or the electrolytic alkaline water for sterilization, which have conventionally been disposed of as having virtually no use, can be transformed into electrolytic waters which can be effectively used.

Furthermore, since the chlorine contained in the primary electrolytic water is filtered out before the secondary electrolysis, a special step for the electrolytes and the like becomes unnecessary; and therefore, an electrolytic water can be obtained easily and reliably which has an oxidation reduction potential and a dissolved oxygen concentration in compliance with its intended use and a dissolved chlorine concentration no higher than needed.

Moreover, the tertiary anodic electrolytic water possesses significantly better values for pH, oxidation reduction potential, dissolved oxygen concentration, and free dissolved chlorine concentration which show a bactericidal effect, and a water can be produced which has a much stronger bactericidal activity than that previously obtained.

While specific embodiments of the present invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. An apparatus for producing an electrolytic water, said apparatus comprising:

a primary electrolyzer including a primary anode and a primary cathode and a separating membrane dividing the interior of the primary electrolyzer into a primary anode compartment containing the primary anode and a cathode compartment containing the primary cathode;

a secondary electrolyzer including a secondary anode and a secondary cathode and a separating membrane dividing the secondary electrolyzer into a secondary anode compartment containing the secondary anode and a secondary cathode compartment containing the secondary cathode;

a first primary outlet for primary anodic water connected to the primary anode compartment;

a first switching valve connected to the first primary outlet;

a second primary outlet for primary cathodic water connected to the primary cathode compartment;

a second switching valve connected to the second primary outlet;

a combined primary outlet passage for connecting the first switching valve with the second switching valve;

a secondary inlet connecting the combined primary outlet with the secondary electrolyzer;

a first secondary outlet for secondary anodic water connected to the secondary anode compartment;

a second secondary outlet for secondary cathodic water connected to the secondary cathode compartment; and a chlorine remover provided in the secondary inlet, between the primary electrolyzer and the secondary electrolyzer.

2. An apparatus for producing an electrolytic water as claimed in claim 1, additionally comprising:

a third switching valve upstream of the chlorine remover in the secondary inlet; and a bypass connecting the third switching valve with the secondary inlet at a point downstream of the chlorine remover, whereby water may be passed either through the chlorine remover or through the bypass by switching the third switching valve.

3. An apparatus for producing an electrolytic water as claimed in claim 1, further comprising:

a secondary anodic water switching valve in the first secondary outlet; and an anodic water communication passage connecting the secondary anodic water switching valve with the first switching valve;

whereby the primary anodic water passing through the first switching valve from the first primary outlet and the secondary anodic water passing through the secondary anodic water switching valve from the first secondary outlet may be mixed in the anodic water communication passage and removed together through the first primary outlet.

4. An apparatus for producing an electrolytic water as claimed in claim 1, further comprising:

a secondary cathodic water switching valve in the second secondary outlet; and a cathodic water communication passage connecting the secondary cathodic water switching valve with the second switching valve;

whereby cathodic water passing through the second switching valve from the second primary outlet and the cathodic water passing through the secondary cathodic water switching valve from the second secondary outlet are mixed in the cathodic water communication passage and removed together through the second primary outlet.

5. A method for producing electrolytic water product comprising:

feeding a raw water to a primary electrolyzer having an interior divided into a primary anode compartment containing an anode and a primary cathode compartment containing a cathode;

electrolyzing the raw water within the primary electrolyzer to produce a primary anodic water and a primary cathodic water;

removing chlorine by passing at least one said primary anodic water and said primary cathodic water through a chlorine filter to produce a chlorine free water;

feeding the chlorine free water to a secondary electrolyzer having an interior divided into a secondary anode compartment containing an anode and a secondary cathode compartment containing a cathode; and electrolyzing the chlorine free water within the secondary electrolyzer to produce a secondary anodic water and a secondary cathodic water.

6. A method for producing an electrolytic water as claimed in claim 5, wherein the primary anodic water only is passed through the chlorine filter and electrolyzed in the secondary electrolyzer.

7. A method for producing an electrolytic water as claimed in claim 5, further comprising:

feeding at least one of the secondary anodic water and the secondary cathodic water to a tertiary electrolyzer having an interior divided into a tertiary anode compartment containing an anode and a tertiary cathode compartment containing a cathode; and electrolyzing the feed to the tertiary electrolyzer to produce a tertiary anodic water and a tertiary cathodic water.

8. A method for producing an electrolytic water as claimed in claim 5 wherein the primary cathodic water only is passed through the chlorine filter and electrolyzed in the secondary electrolyzer.

9. A method for producing an electrolytic water as claimed in claim 5 wherein a mixture of the primary anodic water and the primary cathodic water is passed through the chlorine filter and then electrolyzed in the secondary electrolyzer.

* * * * *